(12) United States Patent
Nakamura

(10) Patent No.: US 7,948,143 B2
(45) Date of Patent: May 24, 2011

(54) STATOR FOR USE IN ELECTRIC ROTARY MACHINE AND ELECTRIC ROTARY MACHINE

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 118 days.

(21) Appl. No.: 12/512,310

(22) Filed: Jul. 30, 2009

(65) Prior Publication Data

US 2010/0026113 A1    Feb. 4, 2010

(30) Foreign Application Priority Data

Jul. 30, 2008   (JP) ................................ 2008-196042

(51) Int. Cl.
*H02K 3/04*   (2006.01)
*H02K 3/28*   (2006.01)
(52) U.S. Cl. ........................................ 310/201; 310/58
(58) Field of Classification Search .................. 310/58, 310/59, 60 R, 65, 201, 206, 207, 208
See application file for complete search history.

(56) References Cited

U.S. PATENT DOCUMENTS

| 6,201,333 B1 * | 3/2001 | Furst ............................. 310/201 |
| 6,373,164 B1 * | 4/2002 | Nishimura ..................... 310/207 |
| 6,501,205 B1 * | 12/2002 | Asao et al. ..................... 310/184 |
| 6,836,046 B2 * | 12/2004 | Gorohata et al. ............. 310/180 |
| 6,885,124 B2 * | 4/2005 | Neet .............................. 310/208 |
| 6,946,759 B2 * | 9/2005 | Asao et al. ....................... 310/45 |
| 6,971,153 B2 * | 12/2005 | Tokizawa et al. ............... 29/596 |
| 7,812,498 B2 * | 10/2010 | Kouda .......................... 310/201 |

FOREIGN PATENT DOCUMENTS

| JP | 2009-112186 | 5/2009 |
| WO | WO 2008/108351 | 9/2008 |

* cited by examiner

*Primary Examiner* — Tran N Nguyen
(74) *Attorney, Agent, or Firm* — Nixon & Vanderhye PC

(57) ABSTRACT

A stator for an electric rotary machine which includes a stator coil which is made up of conducting wires each of which includes in-slot portions disposed one in each of slots formed in a stator core and turned portions each of which connects adjacent two of the in-slot portions outside the slots. Each of the turned portions includes steps adjacent connected through a curved bend. The curved bend of one of the conducting wires is laid to overlap one of turned portions of the other conducting wire in an axial direction of the stator core through a gap. The curved bend has walls extending toward one of the turned portions of the other conducting wire to define a chamber. The walls increase a total area of the stator coil from which thermal energy will dissipate, thus enhancing the ability of the stator coil to be cooled.

5 Claims, 9 Drawing Sheets

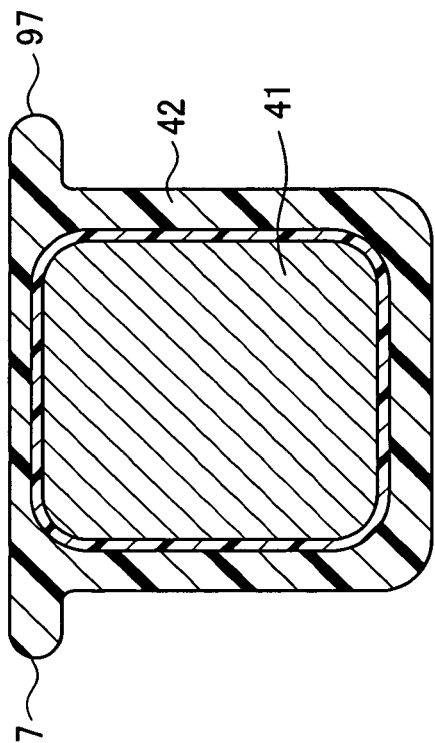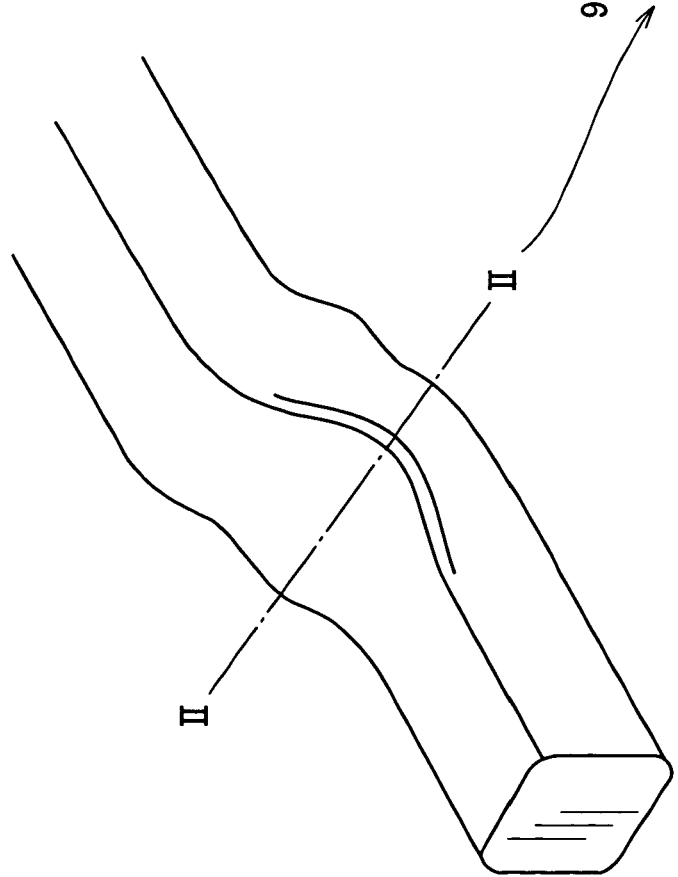

STATOR FOR USE IN ELECTRIC ROTARY MACHINE AND ELECTRIC ROTARY MACHINE

CROSS REFERENCE TO RELATED DOCUMENT

The present application claims the benefit of Japanese Patent Application No. 2008-196042 filed on Jul. 30, 2008, the disclosure of which is incorporated herein by reference.

BACKGROUND OF THE INVENTION

1. Technical Field of the Invention

The present invention relates generally to a structure of a stator for use in a electric rotary machine such as a motor-generator and a electric rotary machine equipped with such a stator for use in, for example, automobiles.

2. Background Art

In recent years, electric rotary machines which are for example used as motor-generators are desired to be miniaturized, produce high-power, and improved in quality.

For example, electric rotary machines for automobiles are required to improve electric power output while space for the electric rotary machine equipped in the engine compartment of the automobile is getting smaller.

Specifically, the miniaturization and production of high-power from the electric rotary machines requires a decrease in winding resistance in each of phase windings of a coil, improvement of the space factor of the phase windings which are disposed within a magnetic circuit of a stator, and close alignment of turned portions of each of the phase windings.

In order to meet the above requirements, electric rotary machines are being studied which have installed therein a stator equipped with a stator core in which a plurality of slots are arrayed in a circumferential direction thereof and a stator coil which is fabricated by a plurality of conducting wires and wound through the slots of the stator core. Each of the conducting wires is made up of in-slot portions to be disposed one in each of the slots and turned portions each of which connects adjacent two of the in-slot portions.

Each of the turned portions of the conducting wire is being developed to include a plurality of steps extending substantially parallel to the surface of either of the ends of the stator core in order to densely-arrange the turned portions to minimize the height thereof above the ends of the stator core.

Adjacent two of the steps of each of the turned portions are connected through an S-curved portion. The S-curved portion has an incurve section which is curved toward the end of the stator core and an outcurve section which is curved away from the end of the stator core. The incurved section is smaller in radius than the outcurve section. Two of the turned portions are arrayed with the incurve and outcurve sections being laid adjacent to each other in a height-wise direction of the stator core through an air gap. The cooling of the stator may be achieved by spraying coolant such as ATF (i.e., automatic transmission fluid) to the stator coil. This causes the coolant to pass also through the air gap between the incurve and outcurve sections. This cooling, however, is not enough to cool the whole of the stator coil. It is also not considered to increase a cooling area of the stator coil.

The steps of each of the turned portions of the conducting wire are usually formed by a press. The pressing will cause the incurve section to have bulges extending perpendicular to a direction in which the curved section extends. The many bulges will be arrayed in a radius direction of the stator core, thus resulting in an increase in size of the stator coil in the radius direction, which disturbs the downsizing of the stator.

SUMMARY OF THE INVENTION

It is therefore a principal object of the invention to provide an improved structure of a stator for use in an electric rotary machine which is permitted to be reduced in size and has enhanced ability to be cooled and an electric rotary machine equipped with such a stator.

According to one aspect of the invention, there is provided a stator for an electric rotary machine which comprises: (a) a hollow cylindrical stator core in which a plurality of slots are arrayed in a circumferential direction thereof; (b) a stator coil installed in the stator core, the stator coil being made up of a plurality of conducting wires each of which includes in-slot portions disposed one in each of the slots and turned portions each of which connects adjacent two of the in-slot portions outside the slots, each of the turned portions including steps adjacent two of which are connected together through a curved bend, the turned portions extending over an end of the stator core so that the curved bend of a first conducting wire that is one of at least two of the conducting wires is laid to overlap one of turned portions of a second conducting wire that is the other of the at least two of the conducting wires in an axial direction of the stator core through a gap; and (3) walls formed on a surface of the curved bend of the first conducting wire which faces a surface of the one of the turned portions of the second conducting wire. The walls extend toward the one of the turned portions of the second conducting wire to define a chamber with the surface of the one of the turned portions of the second conducting wire.

The walls increase a total area of the stator coil from which thermal energy will dissipate, thus enhancing the ability of the stator coil (i.e., the turned portions of the conducting wires) to be cooled. The walls defines the chamber between the first and second conducting wires which are laid to overlap each other. This permits cooling fluid to be supplied to the chamber to cool the stator coil. The cooling fluid is partially accumulated in the chamber to enhance the efficiency of cooling the stator coil.

In the preferred mode of the invention, the walls extend from sides of the curved bend which are opposed to each other in a direction perpendicular to a lengthwise direction of a corresponding one of the turned portions.

Each of the conducting wires is made up of a conductor having a substantially square traverse section and a resinous insulating film wrapped about an outer surface of the conductor. The walls are made of a portion of the insulating film.

According to another aspect of the invention, there is provided an electric rotary machine which comprises: (a) a rotor; and (b) a stator including a cylindrical stator core and a stator coil installed in the stator core to produce magnetic poles which magnetically work to rotate said rotor.

The stator core has a plurality of slots arrayed in a circumferential direction thereof. The stator coil is made up of a plurality of conducting wires each of which includes in-slot portions disposed one in each of the slots and turned portions each of which connects adjacent two of the in-slot portions outside the slots. Each of the turned portions includes steps adjacent two of which are connected together through a curved bend. The turned portions extend over an end of the stator core so that the curved bend of a first conducting wire that is one of at least two of the conducting wires is laid to overlap one of turned portions of a second conducting wire that is the other of the at least two of the conducting wires in an axial direction of the stator core through a gap. A surface of the curved bend of the first conducting wire which faces a surface of the one of the turned portions of the second conducting wire has walls formed thereon. The walls extend toward the one of the turned portions of the second conducting wire to define a chamber with the surface of the one of the turned portions of the second conducting wire.

The walls increase a total area of the stator coil from which thermal energy will dissipate, thus enhancing the ability of the stator coil (i.e., the turned portions of the conducting wires) to be cooled. The walls defines the chamber between the first and second conducting wires which are laid to overlap each other. This permits cooling fluid to be supplied to the chamber to cool the stator coil. The cooling fluid is partially accumulated in the chamber to enhance the efficiency of cooling the stator coil.

In the preferred mode of the invention, the electric rotary machine may also include a cooling mechanism working to supply cooling fluid to the stator so that the cooling fluid flows at least through the chambers to cool the stator coil.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 9(a) is a partially perspective view which shows a turned portion of a conducting wire when an S-shaped bend is formed;

FIG. 9(b) is a traverse sectional view, as taken along the line II-II in FIG. 9(b)

DESCRIPTION OF THE PREFERRED EMBODIMENTS

Figure 1:
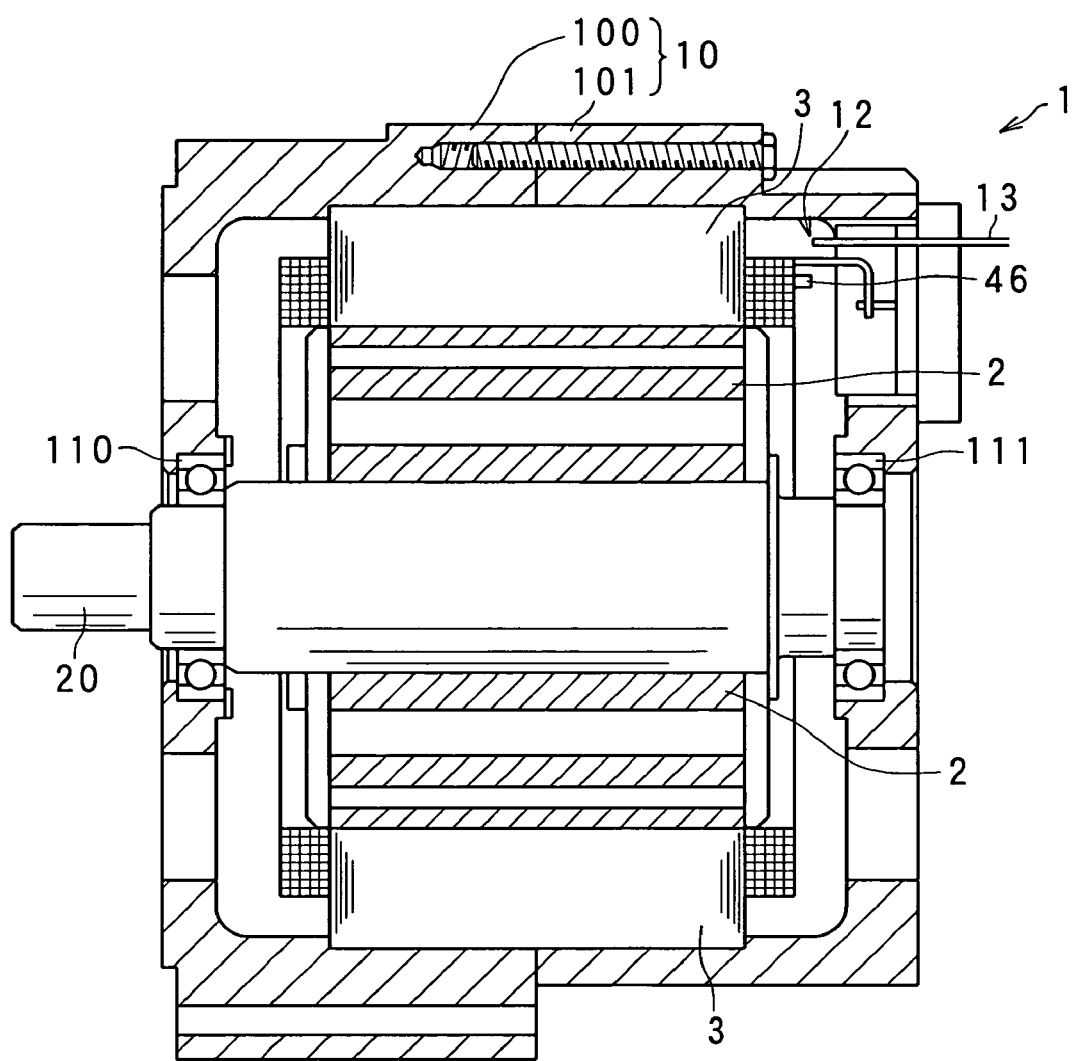
FIG. 1 is a longitudinal sectional view which shows an electric rotary machine equipped with a stator according to an embodiment of the invention.

Referring to the drawings, wherein like reference numbers refer to like parts in several views, particularly to FIG. 1, there is shown an electric rotary machine 1 according to the present invention which may be employed as a motor-generator for automotive vehicles.

The rotary machine 1 includes a hollow housing 10, a rotor 2, and a hollow cylindrical stator 3. The housing 10 is made up of a front cup 100 and a rear cup 101 which are Joined at openings thereof together. The housing 10 has installed therein bearings 110 and 111 through which a rotary shaft 20 is retained to be rotatable. The rotor 2 is fit on the rotary shaft 20. The stator 3 is disposed inside the housing 10 and surrounds the periphery of the rotor 2.

The rotary machine 1 also includes a cooling fluid supplying mechanism equipped with a coolant pipe 13. The coolant pipe 13 extends from outside to inside the housing 10. Specifically, the coolant pipe 13 extends into the rear cup 101 to have a discharge opening 12 from which coolant fluid is discharged. The discharge opening 12 is located above a coil end of a stator coil 4 mounted in the stator 3 in a radius direction of the stator 3 (i.e., a vertical direction, as viewed in FIG. 1). The rotary machine 1 also includes coolant fluid collection and recirculation mechanisms (not shown) through which the cooling fluid, as emitted from the coolant pipe 13, is collected and recirculated to the coolant pipe 13.

The rotor 2 has a plurality of permanent magnets arrayed on an outer circumference thereof facing an inner circumference of the stator 3. The permanent magnets are so oriented as to have S-poles and N-poles arrayed alternately in the circumferential direction of the rotor 2. The number of the poles depends upon the type of the rotary machine 1.

Figure 2:
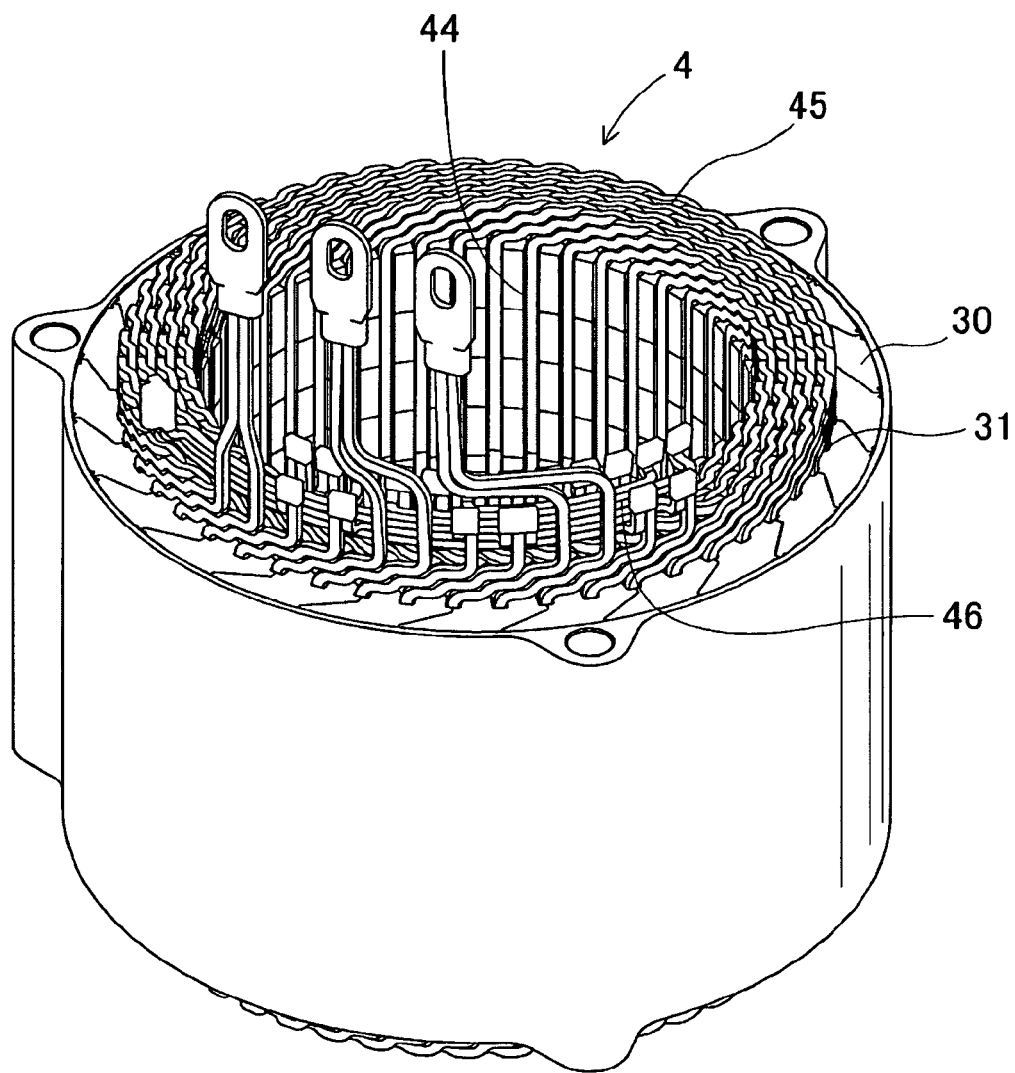
FIGS. 2 is a perspective view which shows the stator installed in the electric rotary machine of FIG. 1.

The stator 3 is, as illustrated in FIG. 2, equipped with a stator core 30 and the three-phase stator coil 4 made up of a plurality of conducting wires 40. The stator 3 may also include electrical insulating paper disposed between the stator core 30 and the stator coil 4.

Figure 3:
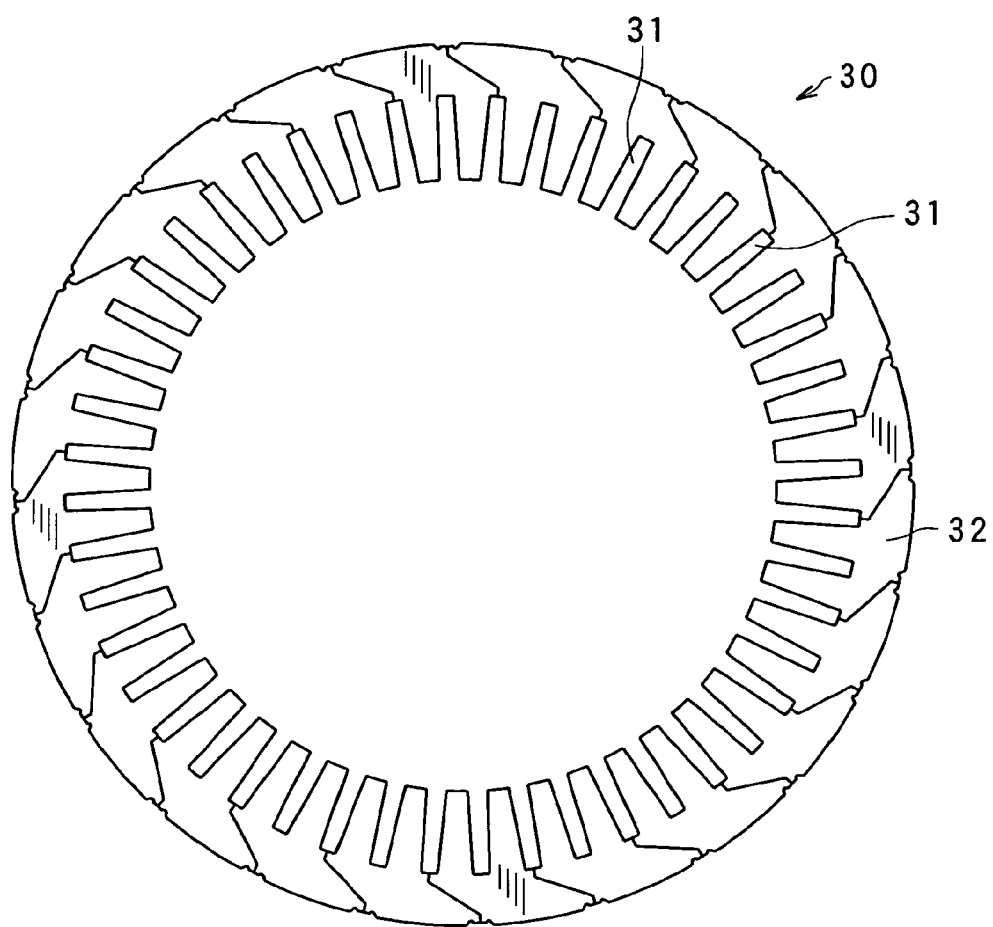
FIG. 3 is a plane view which shows a structure of a stator core of the stator in FIG. 2.

The stator core 30 is, as illustrated in FIG. 3, of an annular shape and has a plurality of slots 31 arrayed in an inner circumference thereof. The slots 31 are oriented radially of the stator core 30. In other words, each of the slots 31 has a depth extending toward the center of the stator core 30.

The stator core 30 is an assembly of a plurality of core pieces 32 arrayed in a circle. Each of the core pieces 32 has one of the slots 31 and is so shaped as to define two of the slots 31 along with left and right adjacent ones of the core pieces 32. Specifically, each of the core pieces 32 is made up of two teeth extending in the radius direction of the stator core 30 and a back core base connecting between the teeth.

Each of the core pieces 32 is made of a stack of a plurality of flat magnetic steel sheets. An insulating sheet is interposed between adjacent two of the magnetic steel sheets. The stator core 30 may alternatively be made of a stack of typically known metal sheets and insulating films.

Figure 4A:
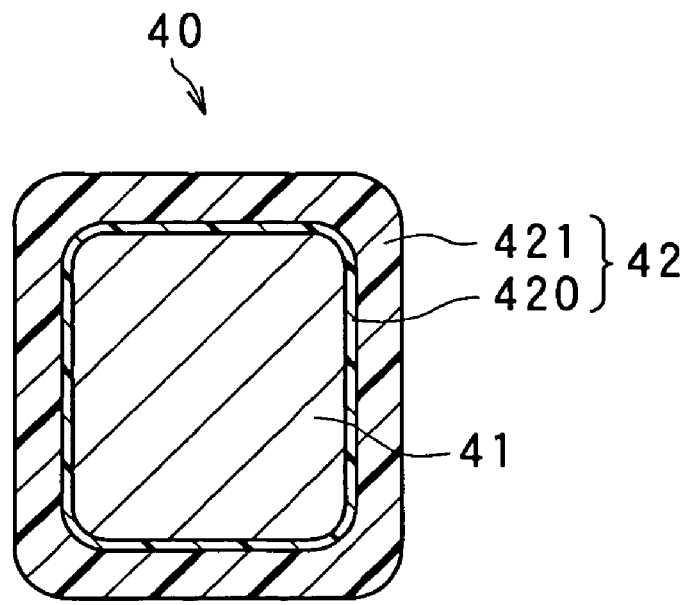
FIG. 4(a) is a traverse sectional view which shows a conducting wire making up a stator coil installed in the stator of FIG. 2.

The stator coil 4 is formed by winding a plurality of conducting wires 40 in a given manner. The conducting wires 40 are, as illustrated in FIG. 4(a), each made of a copper conductor 41 and an insulating film 42 wrapped about the outer surface of the conductor 41. The conductor 41 has a substantially square traverse section. The insulating film 42 includes an inner layer 420 and outer layer 421. A total thickness of the insulating film 42 (including thicknesses of the inner and outer layers 420 and 421) is 100 µm to 200 µm. Such a great thickness of the insulating film 42 eliminates the need for insulating the conducting wires 40 electrically from each other, but insulating sheet may be interposed between the conducting wires 40.

The outer layer 421 is made by insulating material of nylon resin. The inner layer 420 is made by insulating material of polyamide-imide resin or thermoplastic resins of higher glass transition temperature than the outer layer 421. Because the outer layer 421 softens earlier than the inner layer 420 by the heat produced in the electric rotary machine 1, portions of the conducting wires 40 which are disposed in the same lot 31 are attached together by thermal adhesion through the outer layer 421. This causes the portions of the conducting wires 40 which are disposed in the same slot 31 to be integrated physically as a rigid body, thereby enhancing the mechanical strength of the conducting wires 40 within the slots 31. When excessive vibration occurs, a joint area between the inner layer 420 and the outer layer 421 will separate earlier than a joint area of between the conducting wire 40 and the inner layer 420, so that the adhesion between the conducting wires 40 and the inner layer 420 is maintained, and the insulation therebetween is secured.

Figure 4B:
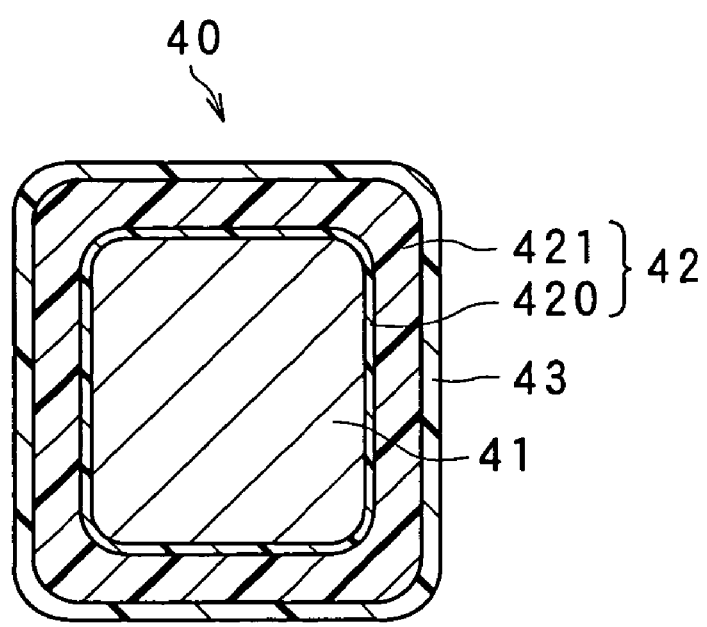
FIG. 4(b) is a traverse sectional view which shows a modification of the winding of FIG. 4(a)

The conducting wires 40 of the coil 4, as illustrated in FIG. 4(b), may also have a fusible bonding material 43 such as epoxy resin with which the insulating film 42 is covered. When subjected to heat generated in the rotary machine 1, the fusible bonding material 43 usually melts earlier than the insulating film 42, thereby causing the conducting wires 40 in each of the slots 31 to be bonded thermally to each other through the fusible bonding material 43. The conducting wires 40 in each of the slots 31 are, therefore, substantially changed into a one-piece steel winding, thus resulting in an increase in mechanical strength of the conducting wires 40 in the slots 31.

The insulating film 42 of the conducting wires 40 may be formed by a layer made of polyphenylene sulfide resins (hereinafter PPS).

Figure 5:
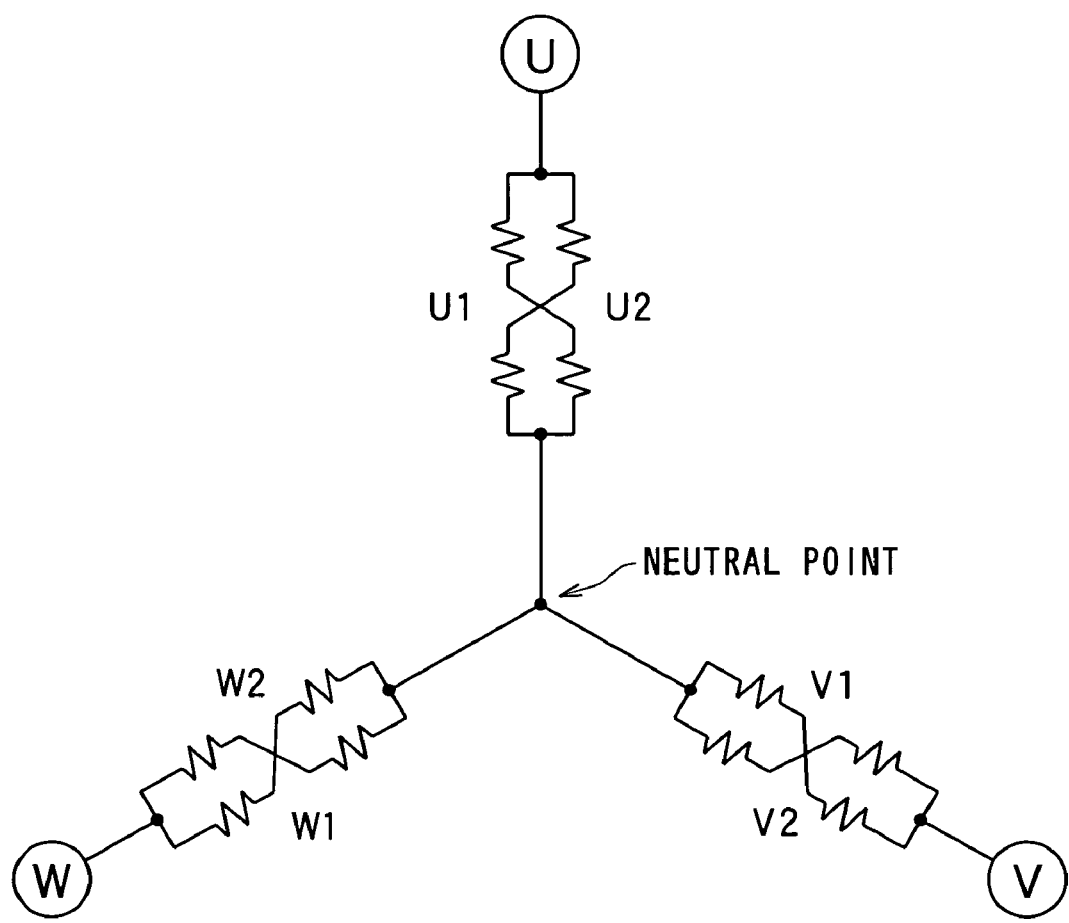
FIG. 5 is a circuit diagram which shows connections of conducting wires of the stator coil installed in the rotary machine of FIG. 1.

The stator coil 4 is, as shown in FIG. 5, fabricated by three phase windings ((U1, U2), (V1, V2), (W1, W2)), two of the conducting wires 40 for each of the three phases.

The coil 4 is constructed by the conducting wires 40 wound together in a predetermined shape. The conducting wires 40 are wave-wound through an inside circumference of the stator core 30. Each of the conducting wires 40 has a plurality of straight in-slot portions 44 disposed in the slots 30 and a plurality of turned portions 45 each of which connects adjacent two of the in-slot portions 44. The in-slot portions 44 of each of the conducting wires 40 are accommodated in every predetermined number of the slots 31 (every 3 phases×2=6 slots 31 in this embodiment). The turned portions 45 project from axially-opposed ends of the stator core 30.

Each of the conducting wires 40 of the stator coil 4 is, as can be seen from FIG. 2, wave-wound from the radially outer side of the stator core 30 in the circumferential direction of the stator core 30 with one end thereof projecting from one of the ends of the stator core 30 as an output on the outermost peripheral side of the stator core 30 and the other end thereof projecting from the one of the ends of the stator core 30 as the neutral point on the innermost peripheral side of the stator core 30. Two of the conducting wires 40 are disposed in each of the slots 31. Each of the conducting wires 40 has the two in-slot portions 44 disposed in one of the slots 31. In other words, each of the conducting wires 40 has a plurality of pairs of the in-slot portions 44, each pair of which is fit in one of the slots 31. Two of the in-slot portions 44 in one of the slots 31 are inverted in positional relation thereof in a depth-wise direction of the slot 31 (i.e., the radial direction of the stator core 30) to those in an adjacent one of the slots 31.

The conducting wires 40 of each of the three phases ((U1, U2), (V1, V2), (W1,W2)) are joined at ends thereof together through a connecting wire 46. Each of the connecting wires 46 extends from an end of one of the turned portions 45 outside the end of the stator core 30.

The turned portions 45 lie on the ends of the stator core 30. The middle of each of the turned portions 45 is substantially shaped in the form of a crank without twisting. The amount of misalignment of the turned portion 45 in the radial direction of the stator core 30 which arises from the formation of the crank is within the width of the conducting wire 40, thereby enabling the turned portions 45 of the conducting wires 40 to be wound tightly without physical interference between the turned portions 45 arrayed in the radial direction of the stator core 30. This results in a decrease in radial width of the coil ends projecting from the ends of the stator core 30, thus avoiding the overhanging of the conducting wires 40 in the radial direction of the stator core 30.

Each of the turned portions 45 extends outside one of the ends of the stator core 30 stepwise in the axial direction of the stator core 30. Specifically, each of the conducting wires 40 has stepwise coil ends to eliminate the physical interference with the conducting wires 40 extending from adjacent ones of the slots 31. This also eliminates the need for increasing the height or width of each of the coil ends in the axial or radial direction of the stator core 30 in order to avoid the interference between the adjacent coil ends, thereby permitting the size of the coil ends to be decreased.

Figure 6:
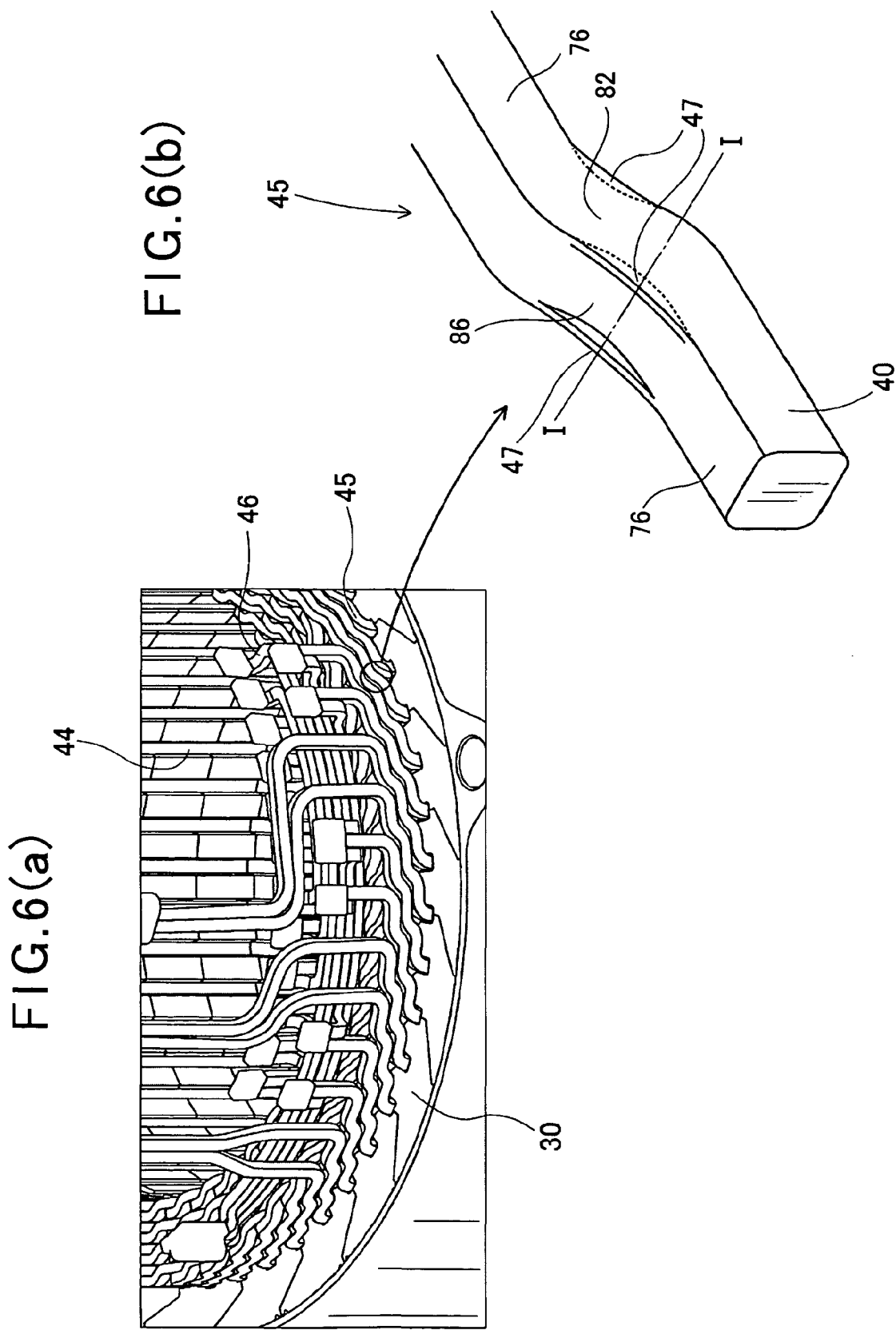
FIG. 6(a) is a partially enlarged view which shows turned portions of conducting wires wound in the stator core of FIG. 2.
FIG. 6(b) is a partially enlarged view which shows an S-shaped bend between turned portions of the conducting wire, as illustrated in FIG. 6(a)

Each of the stepwise turned portions 44 has, for example, four steps 76, as illustrated in FIGS. 6(a) and 6(b), extending substantially parallel to the end of the stator core 30. The height of each of the steps 76, that is, the distance between adjacent two of the steps 76 in a vertical direction (i.e., an axial direction) of the stator core 30 is designed to be substantially identical with the width of the conducting wires 40, thereby permitting the turned portions 45 to be arrayed tightly without unwanted clearances therebetween in the axial direction of the stator core 30.

The outermost one of the steps 76 of the turned portion 45 which is most distant from the end of the stator core 30 has the above described crank-like portion. The turned portion 45 is shaped stepwise to be symmetrical on either side of the outer most step.

Two of the steps 76 of each of the turned portions 45 which extend parallel to and are the closest to the end of the stator core 30, that is, continue from adjacent two of the in-slot portions 44 are placed above the end of the stator core 30 through an air gap. The air gap is provided in order to absorb or ease up the physical stress exerted on the conducting wire 40, keep the insulation of the conducting wire 40, or avoid embedding of the conducting wire 40 into the stator core 30 during shaping the conducting wire 40 or installation of the conducting wire 40 in the stator core 30.

The above structure of the coil 4 (i.e., the conducting wires 40) is also described in Japanese Patent Application No. 2008-110789 filed on Apr. 21, 2008 and International Publication No. WO 2008/108351 A, the disclosure of which is incorporated herein by reference.

Figure 7:
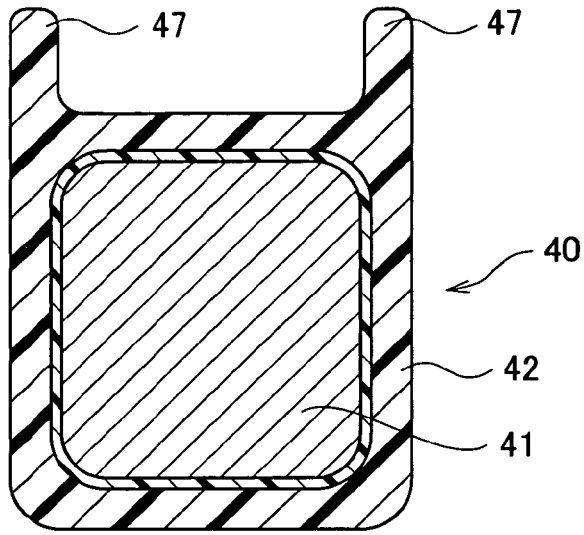
FIG. 7 is a traverse sectional view, as taken along the line I-I in FIG. 6(b)

Each of the stepwise-shaped turned portions 45 of each of the conducting wires 40, as described above, has the steps 76. Adjacent two of the steps 76 are, as illustrated in FIG. 6(b), joined integrally through an S-shaped bend 82. The bend 82 has two opposed curved surfaces 86 one of which faces upward and the other faces downward (i.e., toward the end surface of the stator core 30, as can be seen in FIG. 6(a), when the stator coil 4 is installed in the stator core 30. Each of the curved surfaces 86 has two walls or flanges 47 formed on both sides thereof in a width-wise direction of the conducting wire 40. The flanges 47 extend substantially in a lengthwise direction of the conducting wire 40 in parallel to each other between the surfaces of adjacent two of the steps 76. The flanges 47 also extend inwardly in a radius direction of each of the curved surfaces 86 of the bends 82. In other words, the flanges 47 extend in an axial direction of the stator core 30, that is, in a direction substantially perpendicular to the surface of the end of the stator core 30. The flanges 47 are, as illustrated in FIG. 7, made of portions of the insulating film 42 of the conducting wire 40. FIG. 7 is a sectional view, as taken along the line I-I in FIG. 6(b).

The electric rotary machine 1 is, as described above, designed to jet the cooling fluid from the discharge opening 12 of the coolant pipe 13. ATF (automatic transmission fluid) is used as the cooling fluid in this embodiment, but however, fluid or oil usually used in typical electric rotary machines such as motor-generators may alternatively be employed.

The cooling fluid, as sprayed from the discharge opening 12, hits the coil ends (i.e., the turned portions 45) of the stator 3, then flows along the outer peripheral surface of the turned portions 45, and gets the whole of the conducting wires 40 wet, thereby cooling the stator coil 4.

Figure 8:
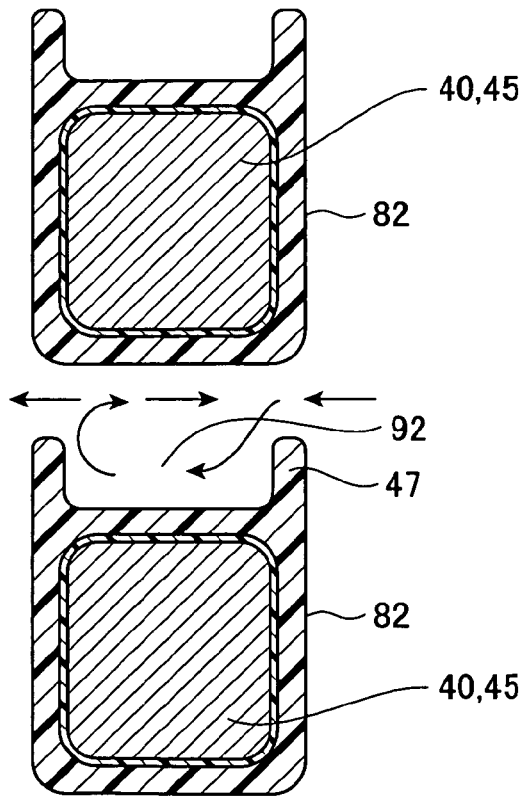
FIG. 8 is a traverse sectional view which shows turned portions of conducting wires laid to overlap each other to define a cooling fluid chamber therebetween.

The interval between adjacent two of the S-shaped bends 82 of the turned portions 45 of the conducting wires 40, as illustrated in FIG. 8, which are laid to overlap each other in a direction vertical to the end of the stator core 30 (i.e., the axial direction of the stator core 30) is smaller at both sides thereof (i.e., the flanges 47), while the interval between the middles of the S-shaped bends 82 in the width-wise direction of the conducting wires 40 is greater. In other words, the flanges 47 of the S-shaped bend 82 of one of the vertically overlapping conducting wires 40 (i.e. the turned portions 45) define a chamber 92 between the curved surface 86 and the bottom surface of a corresponding one of the steps 76 of the other conducting wire 40. This causes the most of the cooling fluid to be accumulated within the air gap (i.e. the chamber 92) between the vertically overlapping turned portions 45 without flowing from between the flanges 47 immediately, thus enhancing the efficiency in cooling the conducting wires 40 (i.e., the turned portions 45).

Formation of Stator Coil

The stator coil 4 is, as described above, made of stator windings or conducting wires 40 shaped in the form of a rectangular wave. Specifically, each of the conducting wires 40 is made up of the in-slot portions 44 extending straight in a direction perpendicular to a lengthwise direction of the conducting wire 40 and the stepwise turned portions 45 extending substantially in the lengthwise direction to connect between adjacent two of the in-slot portions 44. The formation of each of the conducting wires 40 is achieved by clamping portions (e.g., the S-shaped bends 82) of the conducting wire 40 which are to be bent against a press die and bending them into the above shape.

The S-shaped bends 82 of the turned portions 45 of each of the conducting wires 40 is formed by pressing the opposed surfaces (i.e., the surfaces 86) of the portions of the conducting wire 40 against the press die so as to compress or deform portions of the insulating film 42 which form the opposed surfaces of the S-shaped bends 82, as illustrated in FIG. 9(a), thereby forming flanges 97, as illustrated in FIG. 9(b), which extend in width-wise opposite directions.

Figure 10:
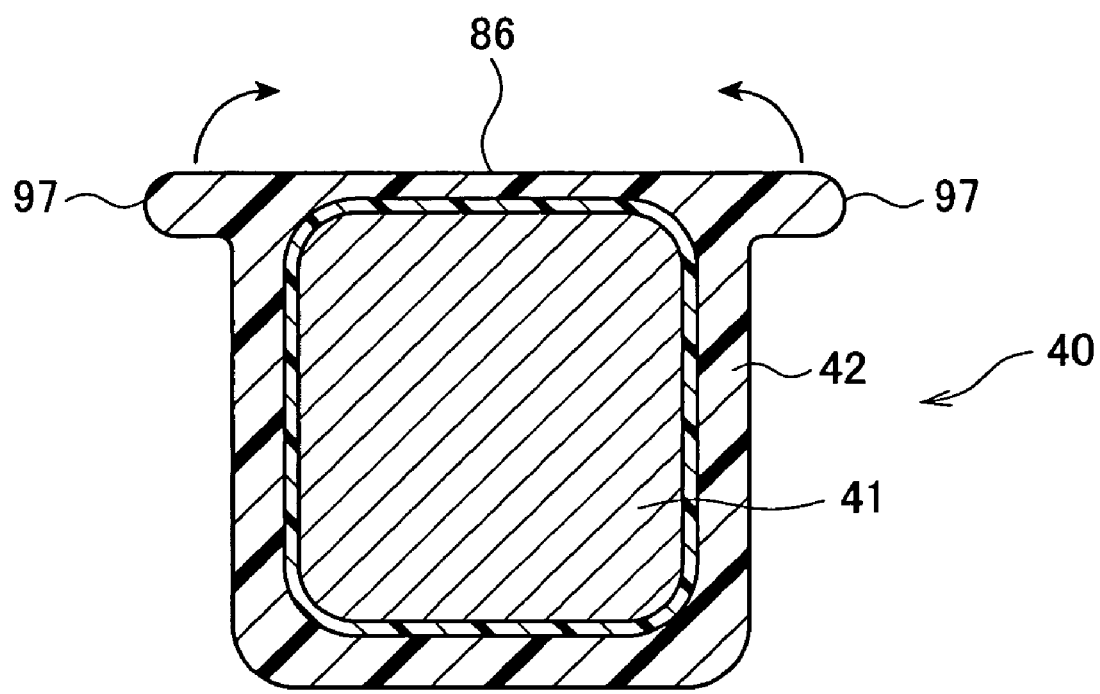
FIG. 10 is a traverse sectional view which shows a bending process of bending bulges to form flanges on an S-shaped bend of a turned portion of a conducting wire.

Next, the flanges 97 are, as illustrated in FIG. 10, bent 90° to form the flanges 47 extending perpendicular to the curved surface 86 of the bend 82, in other words, in a direction perpendicular to the inner peripheral surface of the bend 82.

The flanges 47 are, as illustrated in FIG. 6(b), formed on both the curved surfaces 86 of each of the bends 82, but may be formed only on one of the curved surfaces 86.

The conducting wires 40 formed in the above manner are twisted together or wound into a given shape to make the stator coil 4.

The flanges 97 are usually made in a typical pressing operation. The flanges 97 are, as described above, bent substantially parallel to the side surfaces of the conducting wire 40, thus eliminating the possibility of physical interference between the adjacent conducting wires 40 when the conducting wires 40 are fabricated to make up the stator coil 4 and thereby enhancing the ability of cooling the stator coil 4.

While the present invention has been disclosed in terms of the preferred embodiments in order to facilitate better understanding thereof it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A stator for an electric rotary machine comprising:
a hollow cylindrical stator core includes a plurality of slots are arrayed in a circumferential direction thereof;
a stator coil installed in said stator core, said stator coil being made up of a plurality of conducting wires, each of the conducting wires includes in-slot portions disposed one in each of the slots and turned portions, each of the turned portions connects adjacent two of the in-slot portions outside the slots, each of the turned portions including steps, wherein adjacent two of the steps are connected together through a curved bend, the turned portions extending over an end of said stator core so that the curved bend of a first conducting wire that is one of at least two of the conducting wires is laid to overlap one of turned portions of a second conducting wire that is the other of the at least two of the conducting wires in an axial direction of said stator core through a gap; and
walls formed on a surface of the curved bend of the first conducting wire that faces a surface of the curved bend of the turned portions of the second conducting wire, said walls extending toward the curved bend of the turned portions of the second conducting wire to define a chamber with the surface of the curved bend of the turned portions of the second conducting wire.

2. A stator as set forth in claim 1, wherein said walls extend from sides of the curved bend that are opposed to each other in a direction perpendicular to a lengthwise direction of a corresponding one of the turned portions.

3. A stator as set forth in claim 1, wherein each of the conducting wires is made up of a conductor having a substantially square traverse section and a resinous insulating film wrapped about an outer surface of the conductor, and wherein said walls are made of a portion of the insulating film.

4. An electric rotary machine comprising:
a rotor; and
a stator including a cylindrical stator core and a stator coil installed in the stator core to produce magnetic poles that magnetically work to rotate said rotor, the stator core having a plurality of slots arrayed in a circumferential direction thereof, the stator coil being made up of a plurality of conducting wires, each of the conducting wires includes in-slot portions disposed one in each of the slots and turned portions, each of the turned portions connects adjacent two of the in-slot portions outside the slots, each of the turned portions including steps, wherein adjacent two of the steps are connected together through a curved bend, the turned portions extending over an end of said stator core so that the curved bend of a first conducting wire that is one of at least two of the conducting wires is laid to overlap one of turned portions of a second conducting wire that is the other of the at least two of the conducting wires in an axial direction of said stator core through a gap, a surface of the curved bend of the first conducting wire that faces a surface of the curved bend of the turned portions of the second conducting wire having walls formed thereon, the walls extending toward the curved bend of the turned portions of the second conducting wire to define a chamber with the surface of the curved bend of the turned portions of the second conducting wire.

5. An electric rotary machine as set forth in claim 4, further comprising a cooling mechanism working to supply cooling fluid to said stator so that the cooling fluid flows at least through said chambers to cool the stator coil.

* * * * *